(12) United States Patent
Ping (10) Patent No.: US 11,407,523 B2
(45) Date of Patent: Aug. 9, 2022

(54) SYSTEM AND METHOD FOR BUILDING A LINK BETWEEN AN AIRCRAFT ALERT MESSAGE AND AN ELECTRONIC CHECKLIST ON AN OFF BOARD DEVICE

(71) Applicant: HONEYWELL INTERNATIONAL INC., Morris Plains, NJ (US)

(72) Inventor: Jin Ping, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 212 days.

(21) Appl. No.: 16/922,869

(22) Filed: Jul. 7, 2020

(65) Prior Publication Data

US 2022/0009650 A1 Jan. 13, 2022

(51) Int. Cl.
*G06K 7/14* (2006.01)
*G06K 19/06* (2006.01)
*B64D 43/00* (2006.01)
*G06K 7/10* (2006.01)

(52) U.S. Cl.
CPC .......... *B64D 43/00* (2013.01); *G06K 7/10722* (2013.01); *G06K 7/1413* (2013.01); *G06K 7/1417* (2013.01); *G06K 19/06028* (2013.01); *G06K 19/06037* (2013.01)

(58) Field of Classification Search
CPC .............. G06K 7/1413; G06K 7/1417; G06K 19/06028
USPC ............................................................ 701/3
See application file for complete search history.

(56) References Cited

U.S. PATENT DOCUMENTS

| | | |
|---|---|---|
| 6,753,891 B1 | 6/2004 | Chohan et al. |
| 7,392,486 B1 | 6/2008 | Gyde et al. |
| 8,892,273 B1 | 11/2014 | Raghu et al. |
| 9,158,648 B2 | 10/2015 | Bartlett et al. |
| 10,243,931 B2 | 3/2019 | Latorre-Costa |
| 2015/0088674 A1 | 3/2015 | Flurscheim et al. |
| 2015/0339694 A1* | 11/2015 | Robbin .................. H04W 4/80 705/14.1 |
| 2015/0360796 A1 | 12/2015 | Huet et al. |
| 2017/0275018 A1 | 9/2017 | Narra et al. |
| 2017/0295145 A1 | 10/2017 | Latorre-Costa |

(Continued)

FOREIGN PATENT DOCUMENTS

| | | |
|---|---|---|
| WO | 2013046231 A1 | 4/2013 |
| WO | 2014/047053 A2 | 3/2014 |

*Primary Examiner* — Toan C Ly
(74) *Attorney, Agent, or Firm* — Lorenz & Kopf, LLP (57) ABSTRACT

A method in an aircraft for activating functions on external equipment is provided. The method includes: encoding, in an optical code, information pertaining to an aircraft alert message displayed on a cockpit display; causing a graphical element to be displayed that indicates that the optical code is available for display; receiving the selection of the graphical element; causing the optical code to be displayed responsive to the selection of the graphical element; capturing, by a mobile device, a visual image of the optical code displayed on the cockpit display; decoding, by the mobile device using the visual image, the optical code to identify information pertaining to the displayed aircraft alert message; retrieving, by the mobile device, a checklist containing instructions for responding in view of the information pertaining to the displayed aircraft alert message; and causing the retrieved checklist to be displayed on a display on the mobile device.

20 Claims, 4 Drawing Sheets

(56) References Cited

U.S. PATENT DOCUMENTS

| | | |
|---|---|---|
| 2019/0114927 A1 | 4/2019 | McCullough et al. |
| 2020/0033185 A1 | 1/2020 | Suddreth et al. |
| 2020/0168104 A1 | 5/2020 | Holder et al. |

* cited by examiner

SYSTEM AND METHOD FOR BUILDING A LINK BETWEEN AN AIRCRAFT ALERT MESSAGE AND AN ELECTRONIC CHECKLIST ON AN OFF BOARD DEVICE

TECHNICAL FIELD

Embodiments of the subject matter described herein relate generally to aircraft electronic checklist systems. More particularly, embodiments of the subject matter relate to systems and methods for activating an electronic checklist.

BACKGROUND

An electronic checklist (ECL) for use in an aircraft can be integrated into onboard avionics (referred to herein as onboard ECL) or can be provided outside of the onboard avionics (referred to herein as off-board ECL) from a mobile device such as a portable EFB (electronic flight bag) or other portable electronic device. The mobile device that hosts the off-board ECL, typically does not have a communication connection with onboard avionics system. Thus, an onboard avionics system lacks a way to trigger the display of an off-board ECL. When an aircraft alert requiring the performance of tasks specified in an off-board ECL occurs, a flight crew member, such as the pilot, may have to manually search for the appropriate checklist on the mobile device, for example, via typing a search query on a virtual keyboard. Text input can be cumbersome, particularly due to the small size of many virtual keyboards. This can increase flight crew workload, particularly in what could be a high-stress time, and can increase the flight crew's response time for responding to the condition causing the alert.

Hence, it is desirable to provide an improved system and method for communicating an alert to facilitate the activation of an off-board ECL. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a computer-implemented system for providing checklists on an aircraft is provided. The system includes a controller and a mobile device. The controller is configured by programming instructions to: encode, in an optical code, information pertaining to an aircraft alert message displayed on a cockpit display, wherein the optical code when decoded identifies the information pertaining to the displayed aircraft alert message. The controller is further configured to cause a graphical element to be displayed (e.g., adjacent to the displayed aircraft alert message on the cockpit display or at another position per cockpit design) that indicates that the optical code encoded with the information pertaining to the aircraft alert message is available for display on the cockpit display; receive the selection of the graphical element; and cause the optical code to be displayed (e.g., on the same or different cockpit display) in a dialog window responsive to the selection of the graphical element. The mobile device includes a mobile device controller that is configured by programming instructions to: capture, using an optical code reader, a visual image of the optical code displayed on the cockpit display; decode, using the visual image, the optical code to identify the information pertaining to the displayed aircraft alert message; retrieve a checklist containing instructions (e.g., for the flight crew or maintenance personnel) for responding in view of the information pertaining to the displayed aircraft alert message; and cause the retrieved checklist to be displayed on a display on the mobile device.

In another embodiment, a method in an aircraft for activating functions on external equipment based on aircraft data displayed on an aircraft cockpit display is provided. The method includes: encoding, in an optical code, information pertaining to an aircraft alert message displayed on a cockpit display, wherein the optical code when decoded identifies information pertaining to the displayed aircraft alert message; causing a graphical element to be displayed (e.g., adjacent to the displayed aircraft alert message on the cockpit display or at another position per cockpit design) that indicates that the optical code encoded with the information pertaining to the aircraft alert message is available for display (e.g., on the cockpit display or a different cockpit display); receiving the selection of the graphical element; causing the optical code to be displayed (e.g., on the same or different cockpit display) in a dialog window responsive to the selection of the graphical element; capturing, by a mobile device using an optical code reader, a visual image of the optical code displayed on the cockpit display; decoding, by the mobile device using the visual image, the optical code to identify information pertaining to the displayed aircraft alert message; retrieving a checklist containing instructions (e.g., for the flight crew or maintenance personnel) for responding in view of the information pertaining to the displayed aircraft alert message; and causing the retrieved checklist to be displayed on a display on the mobile device.

In another embodiment, non-transitory computer readable media encoded with programming instructions configurable to cause the performance of a method is provided. The method includes: encoding, in an optical code, information pertaining to an aircraft alert message displayed on a cockpit display, wherein the optical code when decoded identifies information pertaining to the displayed aircraft alert message; causing a graphical element to be displayed adjacent to the displayed aircraft alert message that indicates that the optical code encoded with the information pertaining to the aircraft alert message is available for display (e.g., on the same or different cockpit display); receiving the selection of the graphical element; and causing the optical code to be displayed (e.g., on the same or different cockpit display) in a dialog window responsive to the selection of the graphical element; wherein a mobile device captures a visual image of the optical code using an optical code reader, decodes using the visual image the optical code to identify the information pertaining to the displayed aircraft alert message, retrieves a checklist containing instructions (e.g., for the flight crew or maintenance personnel) for responding in view of the information pertaining to the displayed aircraft alert message, and displays the checklist on a display on the mobile device.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
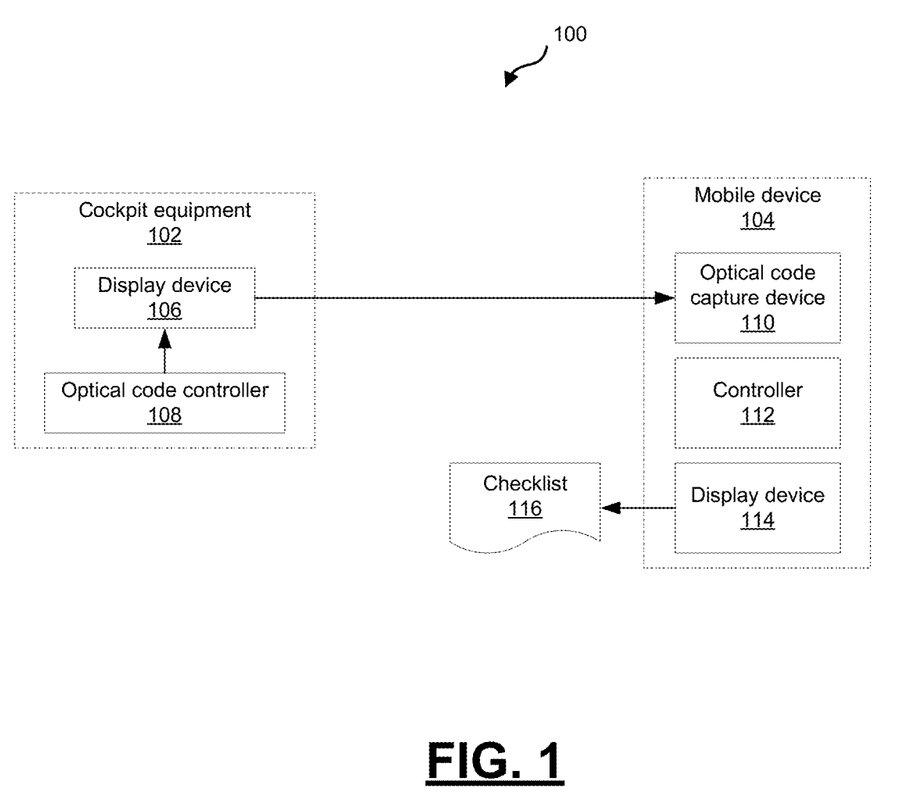
FIG. 1 is a block diagram depicting an example system for providing checklists on an aerial vehicle, in accordance with some embodiments.

The subject matter described herein discloses apparatus, systems, techniques and articles for using an optical code, such as a QR code, as media to transmit alert information, to activate an off-board ECL. FIG. 1 is a block diagram depicting an example system 100 for providing checklists on an aerial vehicle (e.g., airplane, helicopter, vertical takeoff and landing vehicle, or other aircraft). The checklists may be provided for use during flight operations to the flight crew when certain unscheduled events occur. The checklists may be provided while the aerial vehicle is on the ground, for example, during maintenance operations. The example system 100 includes cockpit equipment 102 and a mobile device 104. The cockpit equipment includes a display device 106 such as a Head-Up Display (HUD) device and/or Head-Down Display (HDD) device, and a controller 108 for generating optical codes. The mobile device 104 is a portable electronic device (e.g., tablet computer, smartphone, laptop, Electronic Flight Bag, or other mobile devices) carried into the aircraft cockpit by a flight crew member or maintenance personnel. The mobile device includes an optical code capture device 110 (e.g., a camera), a controller 112, and a display device 114.

Each of the optical code controller 108 and the mobile device controller 112 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The optical code controller 108 is configured by programming instructions to encode, in an optical code, information pertaining to an aircraft alert message displayed on the cockpit display device 106, wherein the optical code when decoded identifies information pertaining to the displayed aircraft alert message. The aircraft alert message may be a trouble message generated by aircraft systems, such as a CAS message, an emergency message (e.g., engine on fire), or some other message, indicating that an unplanned or extraordinary circumstance has occurred regarding which the flight crew should be made aware during flight operations. The aircraft alert message also may be an aircraft equipment failure message that is reported to the flight crew during flight and/or ground operations and/or reported to ground personnel (e.g., maintainers), for example, during maintenance operations.

The optical code is used to represent data regarding the aircraft alert message in a visual, machine-readable form. The optical code may be a linear or one-dimensional (1D) barcode such as a Universal Product Code (UPC) barcode. The optical code may be a two-dimensional (2D) optical code (e.g., matrix code, 2D barcode, or QR code) that uses rectangles, dots, hexagons and other geometric patterns to represent data regarding the aircraft alert message in a visual, machine-readable form.

The optical code controller 108 is further configured by programming instructions to cause a graphical element to be displayed that indicates that an optical code encoded with the information pertaining to an aircraft alert message is available for display on a cockpit display. The graphical element may be displayed adjacent to the aircraft alert message on the same display device 106 or displayed on a different cockpit display device.

Figure 2A:
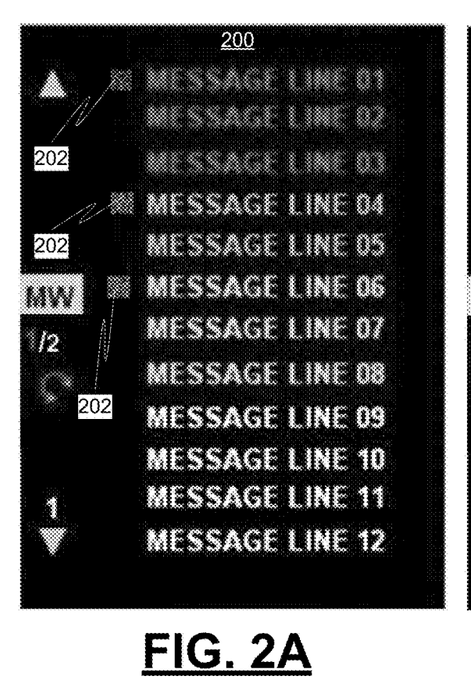
FIGS. 2A, 2B, and 2C are diagrams depicting example ways of displaying a graphical element that indicates that an optical code related to an aircraft message is available for display on a cockpit display, in accordance with some embodiments.
Figure 2B:
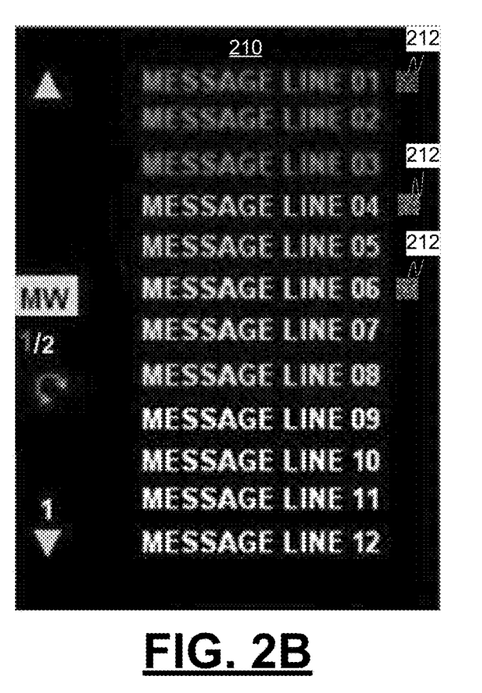
Figure 2C:
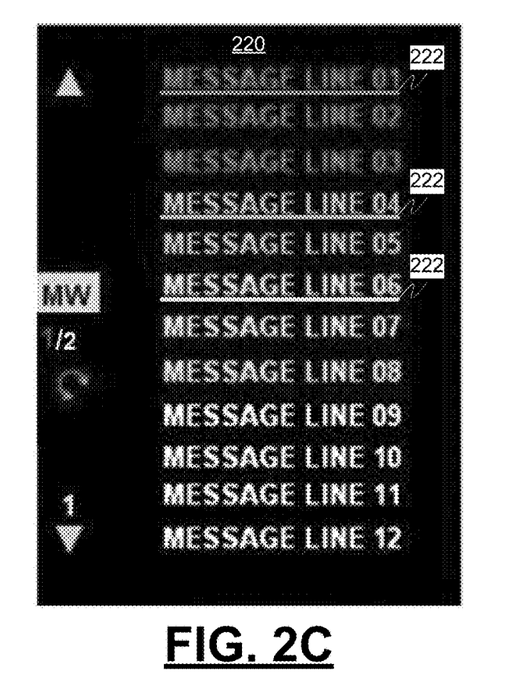

FIGS. 2A, 2B, and 2C are diagrams depicting example ways of displaying a graphical element that indicates that an optical code related to an aircraft message is available for display on a cockpit display. In each diagram, twelve message lines are displayed in a display window. Message Line 01, Message Line 04, and Message Line 06 contain alert messages for which an optical code is available for display on a cockpit display.

In the example of FIG. 2A, a symbol 202 in the shape of a QR code is provided as the graphical element that indicates that an optical code related to an aircraft message is available for display on a cockpit display. In this example, a symbol 202 is provided at the beginning of each of Message Line 01, Message Line 04, and Message Line 06 in the display window 200. Selection of one of the symbols 202 and/or the associated message line will cause an optical code associated with the alert message indicated in the message line to be displayed on a cockpit display. The optical code may be generated prior to selection of the graphical element or after selection of the graphical element.

In the example of FIG. 2B, a symbol 212 in the shape of a QR code is provided as the graphical element that indicates that an optical code related to an aircraft message is available for display on a cockpit display. In this example, a symbol 212 is provided at the end of each of Message Line 01, Message Line 04, and Message Line 06 in the display window 210. Selection of one of the symbols 212 and/or the associated message line will cause an optical code associated with the alert message indicated in the message line to be displayed on a cockpit display. The optical code may be generated prior to selection of the graphical element or after selection of the graphical element.

In the example of FIG. 2C, a symbol 222 in the form of an underline is provided as the graphical element that indicates that an optical code related to an aircraft message is available for display on a cockpit display. In this example, each of Message Line 01, Message Line 04, and Message Line 06 is underlined in the display window 220. Selection of one of Message Line 01, Message Line 04, or Message Line 06 will cause an optical code associated with the alert message indicated in the message line to be displayed on a cockpit display. The optical code may be generated prior to selection of the graphical element or after selection of the graphical element.

The optical code controller 108 is further configured by programming instructions to receive the selection of the graphical element and, responsive thereto, cause the optical code to be displayed on a cockpit display. The optical code may be displayed, for example, in a dialog window adjacent to a display window that displayed the associated alert message. Alternatively or additionally, in some examples, the optical code controller 108 may be further configured by programming instructions to cause the optical code to be automatically displayed on a cockpit display without the selection of the graphical element.

Figure 3A:
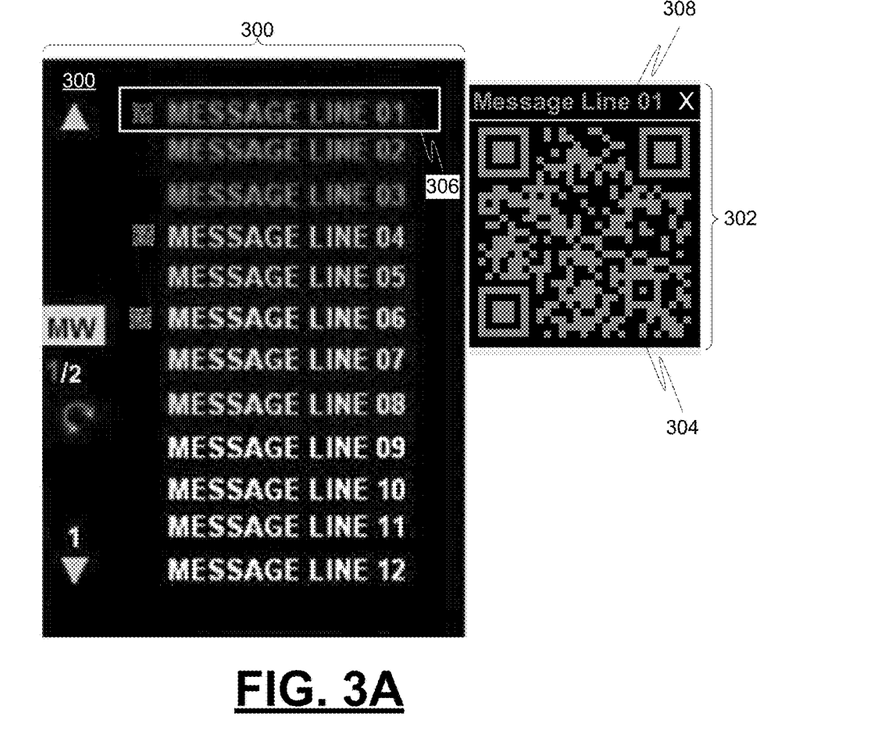
FIG. 3A is a diagram depicting an example display window that displays twelve message lines and a dialog window that displays an optical code that corresponds to an alert message in a selected message line, in accordance with some embodiments.

FIG. 3A is a diagram depicting an example display window 300 that displays twelve message lines and a dialog window 302 that displays an optical code 304 that corresponds to an alert message in a selected message line. In this example, Message Line 01 has been selected as indicated by the box 306 around the message line and the message line header 308 in the dialog window 302, which also indicates that the displayed optical code 304 corresponds to Message Line 01.

The optical code controller 108 is further configured by programming instructions to close the dialog window 302 under a number of different circumstances. The dialog window 302 may be closed, for example, when a predetermined time period has elapsed or by flight crew action, e.g., selection of the "x" in the dialog window 308. The dialog window 302 may be closed, for example, when a cursor used for selecting the graphical element is clicked outside the dialog window, or when the cursor hovers outside of the dialog window for a predetermined period time without click operation. Also, the dialog window 302 may be automatically closed, for example, when a high priority event (e.g., terrain alert or traffic alert) is sensed by an aircraft system.

Figure 3B:
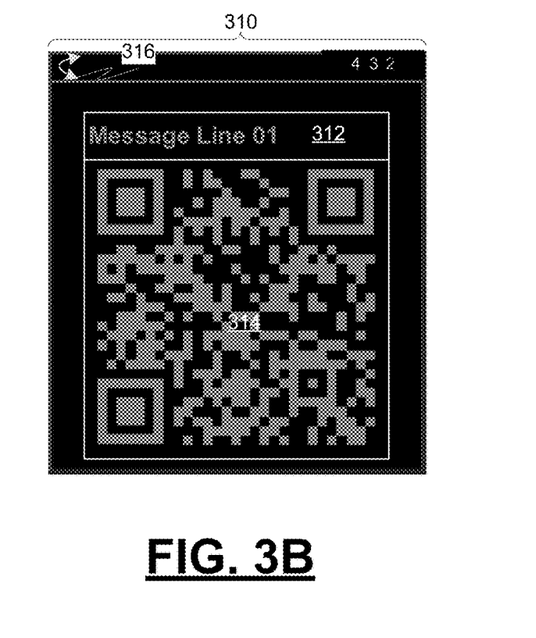
FIG. 3B is a diagram depicting an example dialog window, in accordance with some embodiments.

FIG. 3B is a diagram depicting an example dialog window 310. The example dialog window 310 includes a message line header 312 which identifies the alert message in the selected message line, an optical symbol 314 corresponding to the alert message, a selectable scroll symbol 316 that when selected causes the next optical symbol to be displayed when there are multiple alert messages and the dialog window was opened automatically, and a numeric indicator 318 that indicates the number of alert messages for which optical symbols exist.

In one example operating scenario, a window 310 may pop up automatically if a QR window is not currently displayed when a new CAS message with QR code is triggered. When multiple CAS messages with QR code are triggered and the pilot has not selected any specific CAS message with QR code, the highest priority Level QR code is displayed first (e.g., same priority as CAS message: Warning, Caution, Advisory, Status (from high to low)). If multiple CAS messages are triggered that have the same priority level, the latest CAS message and associated QR code will be displayed. When multiple CAS messages with QR code are triggered and the pilot selects a specific CAS message with QR code, the QR code corresponding to the selected CAS message will be displayed until the pilot select a new CAS message or scrolls to a different QR code or a new CAS message with same priority or higher priority.

The optical code controller 108 is further configured by programming instructions to close the dialog window 310 under a number of different circumstances. The dialog window 310 may be closed, for example, when a predetermined time period has elapsed or by flight crew action, e.g., selection of another window other than the dialog window 310, like waypoint list waypoint, CDTI window, etc. Also, the dialog window 310 may be automatically removed and return back to the original window displayed, for example, when a high priority event (e.g., terrain alert or traffic alert) is sensed by an aircraft system.

Referring back to FIG. 1, the mobile device controller 112 is configured by programming instructions to cause the mobile device to capture, using the optical code capture device 110, a visual image of the optical code displayed on a cockpit display. The optical code capture device 110 may, for example, be a camera on the mobile device.

The mobile device controller 112 is further configured by programming instructions to decode, using the captured visual image, the optical code to identify information pertaining to the aircraft alert message displayed on the cockpit display and retrieve a checklist 116 containing instructions (e.g., for the flight crew or maintenance personnel) for responding in view of the information pertaining to the displayed aircraft alert message. The checklist 116 may be resident in a data store on the mobile device 104 or may be retrieved from outside of the mobile device, for example, on a cloud-based data store. The mobile device controller 112 is further configured by programming instructions to cause the retrieved checklist 116 to be displayed on the display device 114.

Figure 4:
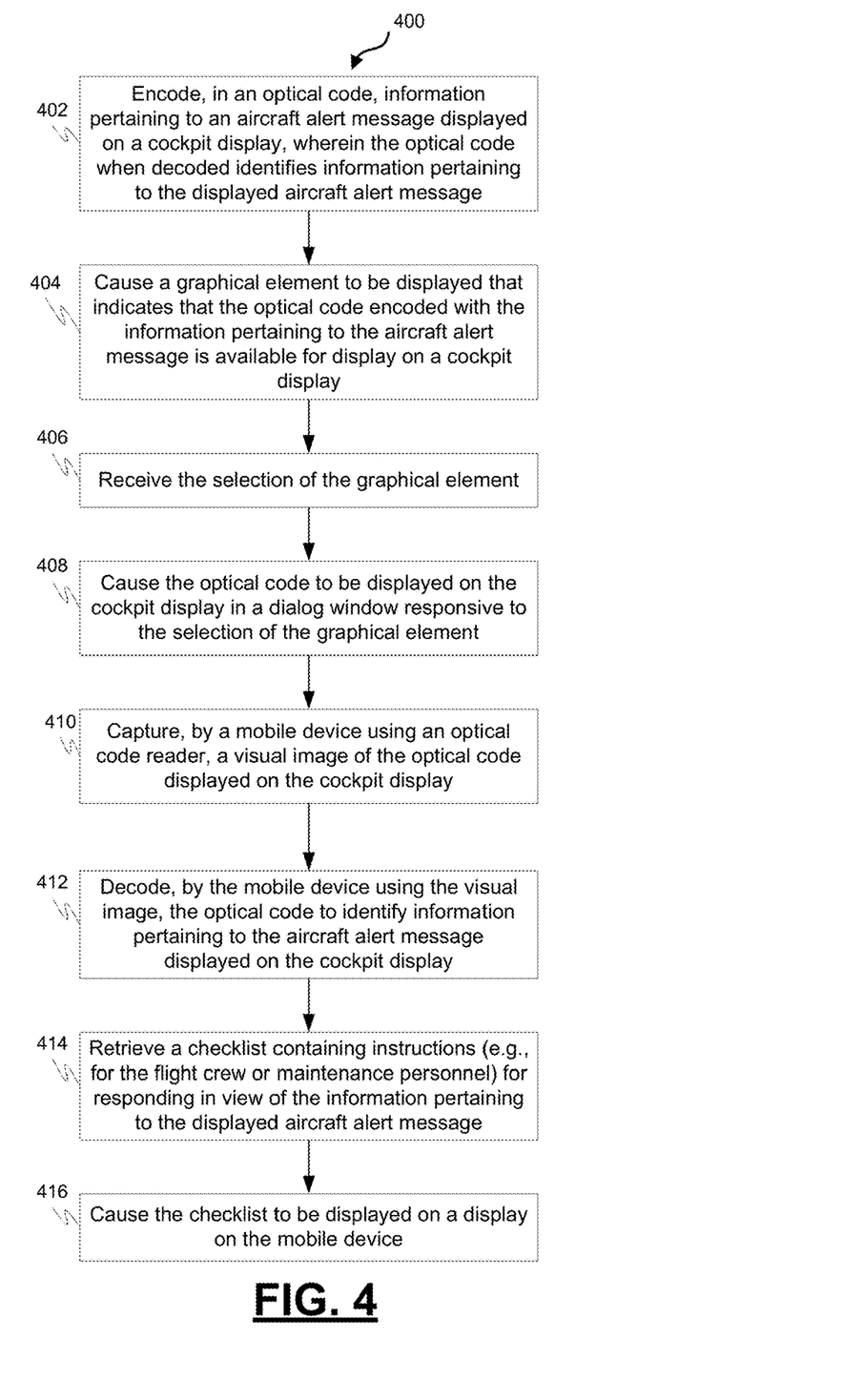
FIG. 4 is a process flow chart depicting an example process for providing checklists on an aerial vehicle, in accordance with some embodiments.

FIG. 4 is a process flow chart depicting an example process 400 for providing checklists on an aerial vehicle. The order of operation within the process 400 is not limited to the sequential execution as illustrated in the figure, but may be performed in one or more varying orders as applicable and in accordance with the present disclosure.

The example process 400 includes encoding, in an optical code, information pertaining to an aircraft alert message displayed on a cockpit display, wherein the optical code when decoded identifies information pertaining to the displayed aircraft alert message (operation 402).

The example process 400 includes causing a graphical element to be displayed that indicates that the optical code encoded with the information pertaining to the aircraft alert message is available for display on a cockpit display (operation 404).

The example process 400 includes receiving the selection of the graphical element (operation 406) and causing the optical code to be displayed on the cockpit display in a dialog window responsive to the selection of the graphical element (operation 408).

The example process 400 includes capturing, by a mobile device using an optical code reader, a visual image of the optical code displayed on the cockpit display (operation 410), decoding, by the mobile device using the visual image, the optical code to identify information pertaining to the aircraft alert message displayed on the cockpit display (operation 412), retrieving a checklist containing instructions (e.g., for the flight crew or maintenance personnel) for responding in view of the information pertaining to the displayed aircraft alert message (operation 414); and causing the checklist to be displayed on a display on the mobile device (operation 416). The flight crew and/or ground personnel can view the checklist and perform the instructions contained therein. This can be a quick way of making a checklist available when an abnormal condition occurs on the aircraft.

Described herein are apparatus, systems, techniques and articles for using an optical code, such as a QR code, as media to transmit alert information, to activate an off-board ECL. In one embodiment, a computer-implemented system for providing checklists on an aircraft is provided. The system comprises a controller and a mobile device. The controller is configured by programming instructions to: encode, in an optical code, information pertaining to an aircraft alert message displayed on a cockpit display, wherein the optical code when decoded identifies the information pertaining to the displayed aircraft alert message. The controller is further configured to cause a graphical element to be displayed (e.g., adjacent to the displayed aircraft alert message on the cockpit display or on a different cockpit display) that indicates that the optical code encoded with the information pertaining to the aircraft alert message is available for display on the cockpit display; and cause the optical code to be displayed (e.g., on the same or different cockpit display) in a dialog window. The mobile device comprises a mobile device controller that is configured by programming instructions to: capture, using an optical code reader, a visual image of the optical code displayed on the cockpit display; decode, using the visual image, the optical code to identify the information pertaining to the aircraft alert message displayed on the cockpit display; retrieve a checklist containing instructions (e.g., for the flight crew or maintenance personnel) for responding in view of the information pertaining to the displayed aircraft alert message; and cause the retrieved checklist to be displayed on a display on the mobile device.

These aspects and other embodiments may include one or more of the following features. The optical code may comprise a one-dimensional or linear barcode that encodes information by varying the widths and/or spacings of parallel lines. The optical code may comprise a two-dimensional or matrix barcode that encodes information using squares, rectangles, dots, hexagons or other geometric patterns. The matrix barcode may comprise a Quick Response code (QR code). The optical code reader may comprise a camera on the mobile device. The aircraft alert message may comprise a crew-alerting system (CAS) message. The checklist may be retrieved from a data store on the mobile device. The checklist may be retrieved from a cloud-based data store. The cockpit display may comprise an integrated navigational (INAV) display or a multifunction display (MFD), or others The controller in the onboard avionics equipment may be further configured to close the dialog window when: a predetermined time period has elapsed, the dialog window has been closed by flight crew action, a cursor used for selecting the graphical element has been clicked outside the dialog window, the cursor hovers outside of the dialog window for a predetermined period time without click operation, and/or a high priority event (e.g., terrain alert or traffic alert) is sensed by an aircraft system. The controller may be further configured to receive the selection of the graphical element and to cause the optical code to be displayed responsive to the selection of the graphical element.

In another embodiment, a method in an aircraft for activating functions on external equipment based on aircraft data displayed on an aircraft cockpit display is provided. The method comprises: encoding, in an optical code, information pertaining to an aircraft alert message displayed on a cockpit display, wherein the optical code when decoded identifies information pertaining to the displayed aircraft alert message; causing a graphical element to be displayed (e.g., adjacent to the displayed aircraft alert message on the cockpit display or on a different cockpit display) that indicates that the optical code encoded with the information pertaining to the aircraft alert message is available for display (e.g., on the cockpit display or a different cockpit display); receiving the selection of the graphical element; causing the optical code to be displayed (e.g., on the same or different cockpit display) in a dialog window; capturing, by a mobile device using an optical code reader, a visual image of the optical code displayed on the cockpit display; decoding, by the mobile device using the visual image, the optical code to identify information pertaining to the displayed aircraft alert message; retrieving a checklist containing instructions (e.g., for the flight crew or maintenance personnel) for responding in view of the information pertaining to the displayed aircraft alert message; and causing the retrieved checklist to be displayed on a display on the mobile device.

These aspects and other embodiments may include one or more of the following features. The optical code may comprise a one-dimensional or linear barcode that encodes information by varying the widths and/or spacings of parallel lines. The optical code may comprise a two-dimensional or matrix barcode that encodes information using squares, rectangles, dots, hexagons or other geometric patterns. The matrix barcode may comprise a Quick Response code (QR code). The optical code reader may comprise a camera on the mobile device. The aircraft alert message may comprise a crew-alerting system (CAS) message. The checklist may be retrieved from a data store on the mobile device. The checklist may be retrieved from a cloud-based data store. The method may further comprise closing the dialog window when: a predetermined time period has elapsed, the dialog window has been closed by flight crew action, a cursor used for selecting the graphical element has been clicked outside the dialog window, the cursor hovers outside of the dialog window for a predetermined period time without click operation, and/or a high priority event (e.g., terrain alert or traffic alert) has been sensed by an aircraft system. The method may further comprise receiving the selection of the graphical element and causing the optical code to be displayed in a dialog window responsive to the selection of the graphical element.

In another embodiment, non-transitory computer readable media encoded with programming instructions configurable to cause the performance of a method is provided. The method comprises: encoding, in an optical code, information pertaining to an aircraft alert message displayed on a cockpit display, wherein the optical code when decoded identifies information pertaining to the displayed aircraft alert message; causing a graphical element to be displayed adjacent to the displayed aircraft alert message that indicates that the optical code encoded with the information pertaining to the aircraft alert message is available for display (e.g., on the same or different cockpit display); receiving the selection of the graphical element; and causing the optical code to be displayed (e.g., on the same or different cockpit display) in a dialog window responsive to the selection of the graphical element; wherein a mobile device captures a visual image of the optical code using an optical code reader, decodes using the visual image the optical code to identify the information pertaining to the displayed aircraft alert message, retrieves a checklist containing instructions (e.g., for the flight crew or maintenance personnel) for responding in view of the information pertaining to the displayed aircraft alert message, and displays the checklist on a display on the mobile device.

These aspects and other embodiments may include one or more of the following features. The optical code may comprise a one-dimensional or linear barcode that encodes information by varying the widths and/or spacings of parallel lines. The optical code may comprise a two-dimensional or matrix barcode that encodes information using squares, rectangles, dots, hexagons or other geometric patterns. The matrix barcode may comprise a Quick Response code (QR code). The optical code reader may comprise a camera on the mobile device. The aircraft alert message may comprise a crew-alerting system (CAS) message. The checklist may be retrieved from a data store on the mobile device. The checklist may be retrieved from a cloud-based data store. The method may further comprise closing the dialog window when: a predetermined time period has elapsed, the dialog window has been closed by flight crew action, a cursor used for selecting the graphical element has been clicked outside the dialog window, the cursor hovers outside of the dialog window for a predetermined period time without click operation, and/or a high priority event (e.g., terrain alert or traffic alert) has been sensed by an aircraft system.

In another embodiment, a method in an aircraft for activating functions on external equipment based on aircraft data displayed on an aircraft cockpit display is provided. The method comprises: providing, in an onboard avionics system, a code generation application configured to generate: a plurality of machine readable optical codes (e.g., QR code or bar code), wherein each machine readable optical code is specific for a different aircraft alert message generated by an aircraft cockpit system (during flight and/or on the ground) and displayed on the cockpit display (during flight and/or on the ground) and is configured to capture the information content of the aircraft alert message to which it pertains, and a graphical element to present on the cockpit display adjacent to an aircraft alert message (or at another position per cockpit design) that when selected causes the display of a generated machine readable optical code that pertains to the aircraft alert message in a dialog window on the cockpit display; generating during flight, using the code generation application, a machine readable optical code pertaining to an aircraft alert message displayed on the cockpit display, wherein the machine readable optical code when decoded provides the information content of the displayed aircraft alert message; causing a graphical element to be displayed adjacent to the displayed aircraft alert message on the cockpit display; receiving, by the onboard avionics system during flight, the selection of the graphical element; causing, by the code generation application, the machine readable optical code to be displayed on the cockpit display in a dialog window responsive to the selection of the graphical element; capturing, by a mobile device during flight, a visual image of the machine readable optical code displayed on the cockpit display; decoding, by the mobile device during flight, the machine readable optical code to retrieve the information content of the displayed aircraft alert message, wherein the mobile device retrieves the information content of the displayed aircraft alert message (during flight) from an aircraft cockpit system without a wired or wireless connection with the aircraft cockpit system; and displaying, by the mobile device, the display of a checklist.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computer-implemented system for providing checklists on an aircraft, the system comprising:
   a controller in onboard avionics equipment, the controller configured by programming instructions to:
      encode, in an optical code, information pertaining to an aircraft alert message displayed on a cockpit display, wherein the optical code when decoded identifies the information pertaining to the displayed aircraft alert message;
      cause a graphical element to be displayed that indicates that the optical code encoded with the information pertaining to the aircraft alert message is available for display; and
      cause the optical code to be displayed in a dialog window; and
   a mobile device comprising a mobile device controller configured by programming instructions to:
      capture, using an optical code reader, a visual image of the displayed optical code;
      decode, using the visual image, the optical code to identify the information pertaining to the displayed aircraft alert message;
      retrieve a checklist containing instructions for responding in view of the information pertaining to the displayed aircraft alert message; and
      cause the checklist to be displayed on a display on the mobile device.

2. The system of claim 1, wherein the optical code comprises a one-dimensional or linear barcode that encodes information by varying the widths and/or spacings of parallel lines.

3. The system of claim 1, wherein the optical code comprises a two-dimensional or matrix barcode that encodes information using squares, rectangles, dots, hexagons or other geometric patterns.

4. The system of claim 1, wherein the matrix barcode comprises a Quick Response code (QR code).

5. The system of claim 1, wherein the optical code reader comprises a camera on the mobile device.

6. The system of claim 1, wherein the aircraft alert message comprises a crew-alerting system (CAS) message.

7. The system of claim 1, wherein the checklist is retrieved from a data store on the mobile device.

8. The system of claim 1, wherein the checklist is retrieved from a cloud-based data store.

9. The system of claim 1, wherein the controller is further configured to receive the selection of the graphical element and to cause the optical code to be displayed responsive to the selection of the graphical element.

10. The system of claim 1, wherein the controller in the onboard avionics equipment is further configured to close the dialog window when:
   a predetermined time period has elapsed,
   the dialog window has been closed by flight crew action, a cursor used for selecting the graphical element is clicked outside the dialog window, the cursor hovers outside of the dialog window for a predetermined period time without click operation, and a high priority event is sensed by an aircraft system.

11. A method in an aircraft for activating functions on external equipment based on aircraft data displayed on an aircraft cockpit display, the method comprising:

encoding, in an optical code, information pertaining to an aircraft alert message displayed on a cockpit display, wherein the optical code when decoded identifies information pertaining to the displayed aircraft alert message;

causing a graphical element to be displayed that indicates that the optical code encoded with the information pertaining to the aircraft alert message is available for display;

causing the optical code to be displayed in a dialog window;

capturing, by a mobile device using an optical code reader, a visual image of the displayed optical code;

decoding, by the mobile device using the visual image, the optical code to identify information pertaining to the displayed aircraft alert message;

retrieving, by the mobile device, a checklist containing instructions for responding in view of the information pertaining to the displayed aircraft alert message; and causing, by the mobile device, the checklist to be displayed on a display on the mobile device.

12. The method of claim 11, wherein the optical code comprises a one-dimensional or linear barcode that encodes information by varying the widths and spacings of parallel lines.

13. The method of claim 11, wherein the optical code comprises a two-dimensional or matrix barcode that encodes information using squares, rectangles, dots, hexagons or other geometric patterns.

14. The method of claim 11, wherein the matrix barcode comprises a Quick Response code (QR code).

15. The method of claim 11, wherein the aircraft alert message comprises a crew-alerting system (CAS) message.

16. The method of claim 11, wherein the checklist is retrieved from a data store on the mobile device.

17. The method of claim 11, wherein the checklist is retrieved from a cloud-based data store.

18. The method of claim 11, further comprising receiving the selection of the graphical element and causing the optical code to be displayed in a dialog window responsive to the selection of the graphical element.

19. The method of claim 11, further comprising closing the dialog window when:

a predetermined time period has elapsed, the dialog window has been closed by flight crew action, a cursor used for selecting the graphical element is clicked outside the dialog window, the cursor hovers outside of the dialog window for a predetermined period time without click operation, or a high priority event is sensed by an aircraft system.

20. Non-transitory computer readable media encoded with programming instructions configurable to cause the performance of a method, the method comprising:

encoding, in an optical code, information pertaining to an aircraft alert message displayed on a cockpit display, wherein the optical code when decoded identifies information pertaining to the displayed aircraft alert message;

causing a graphical element to be displayed adjacent to the displayed aircraft alert message that indicates that the optical code encoded with the information pertaining to the aircraft alert message is available for display;

receiving the selection of the graphical element; and causing the optical code to be displayed in a dialog window responsive to the selection of the graphical element;

wherein a mobile device captures a visual image of the displayed optical code using an optical code reader, decodes using the visual image the optical code to identify the information pertaining to the displayed aircraft alert message, retrieves a checklist containing instructions for responding in view of the information pertaining to the displayed aircraft alert message, and displays the retrieved checklist on a display on the mobile device.

* * * * *